June 10, 1930.  R. WEDEBERG  1,762,566
SIGNAL FOR LUBRICATING SYSTEMS
Filed March 1, 1929
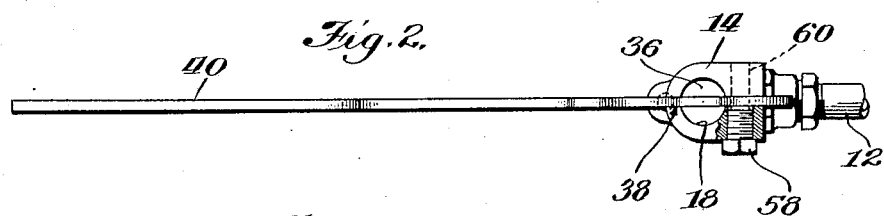
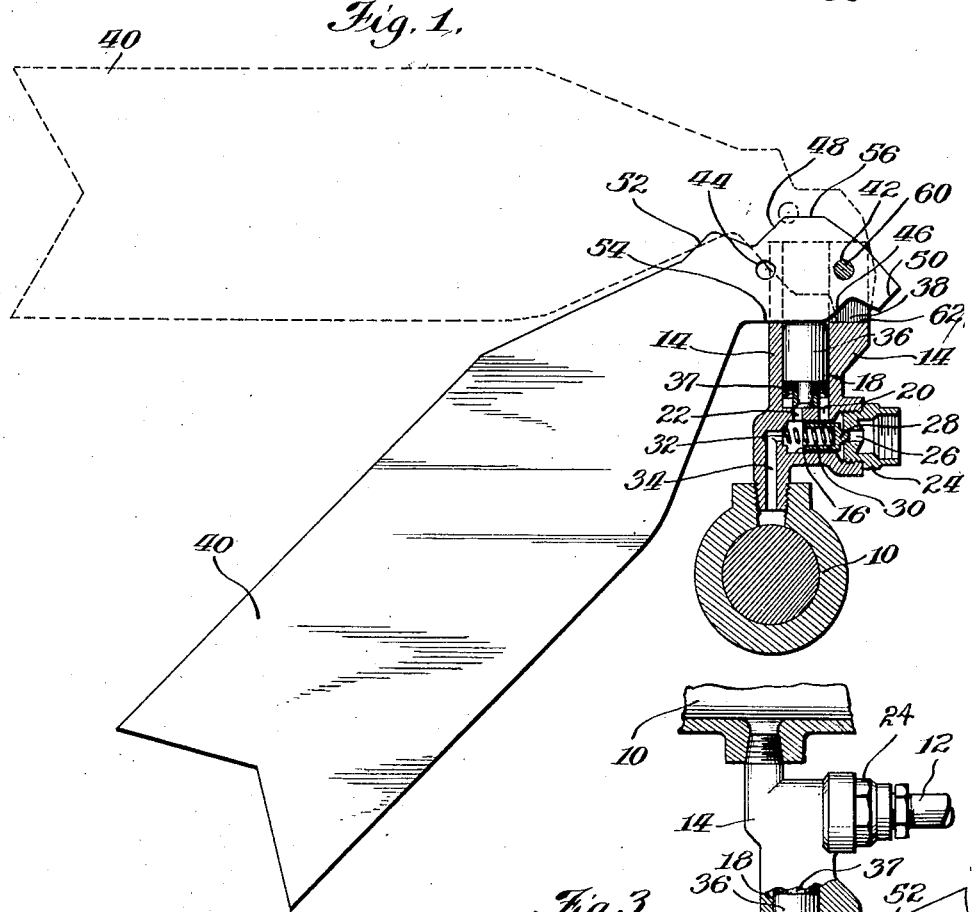
Inventor
Reuben Wedeberg
By Williams, Bradbury, McCabe & Hinkle
Attys.

Patented June 10, 1930

1,762,566

UNITED STATES PATENT OFFICE

REUBEN WEDEBERG, OF CHICAGO, ILLINOIS, ASSIGNOR TO ALEMITE CORPORATION, OF CHICAGO, ILLINOIS, A CORPORATION OF DELAWARE

SIGNAL FOR LUBRICATING SYSTEMS

Application filed March 1, 1929. Serial No. 343,822.

My invention relates generally to lubricating apparatus and more particularly to improvements in central systems in which a plurality of bearings are adapted to be successively lubricated from a single source.

One of the objects is to provide an improved signal device adapted to be attached to the last bearing of a series to indicate that the lubricating operation has been completed.

A further object is to provide an improved gravity operated indicator for the above-mentioned purpose.

A further object is to provide an improved indicator, the indicating arm of which is adapted to be mounted in any one of a number of different positions.

Other objects and advantages will appear from the following description, reference being had to the accompanying drawings, in which Fig. 1 is a side elevation with parts broken away in section;

Fig. 2 is a plan view partially in section; and

Fig. 3 is a side elevation of the indicating device mounted on the lower side of a bearing.

In the drawings I have shown the last bearing 10 of a number of bearings, all of which have progressive measuring valves of the series or progressive type mounted thereon. These bearings are lubricated successively from a single source under pressure, the measuring valves being mounted in a series which terminates with a conduit 12 leading into the measuring and indicating valve of my invention, which is attached to the last bearing of the series.

This measuring and indicating valve comprises a body 14 having a horizontal cylinder 16 and a vertical cylinder 18. An inlet port 20 and a discharge port 22 connect these two cylinders, the conduit 12 being connected to the right-hand end of the cylinder 16 by a suitable union 24. The fitting 24 has a small port 26 which is normally closed by a substantially conical projection 28 formed at the end of a piston valve 30, the projection 28 being held against the port 26 by a spring 32. The skirt portion of the piston valve 30 thus normally covers the inlet port 20. The piston valve is of slightly smaller diameter than the cylinder 16 so as readily to reciprocate therein and also to permit slow by-passage of lubricant.

The left-hand end of the cylinder 16 communicates with the oil hole of the bearing 10 through a discharge duct 34. A plunger 36 having a cup leather 37 secured to the lower end thereof is freely reciprocable in the cylinder 18.

The upper end of the valve body 14 has a transverse slot 38 which forms a guide for a semaphore signal arm 40. This semaphore arm has two holes 42 and 44 adjacent one end thereof and is conformed to have camming surfaces 46 and 48, operative stop surfaces 50 and 52 and inoperative stop surfaces 54 and 56. The arm 40 is pivotally connected to the body 14 by a stud 58 which is threaded transversely in the upper portion of the body and has a cylindrical reduced end portion 60 adapted to pass through the hole 42 or hole 44 in the semaphore arm.

When the semaphore arm is pivotally connected to the valve body as shown in Fig. 1, with the stud 58 passing through the hole 42, the stop surfaces 50 and 54 engage the surface 62 at the lower end of the slot 38. The device may be mounted in inverted position as shown in Fig. 3, in which event the semaphore arm 40 is pivotally connected to the valve body by passing the stud 58 through the hole 44 so that the stop surfaces 52 and 56 will be adapted to abut against the end 62 of the slot 38.

In operation, lubricant will be forced into the device under pressure through the inlet port 26 and move the piston valve 30 to the left (Fig. 1) until the piston reaches the leftmost end of its stroke. Due to the relatively small cross sectional area of the port 26, a considerably greater pressure will be required to initiate movement of the valve 30 to the left than will be required to cause continued motion of the valve.

The valve will therefore, as soon as the pressure is sufficient to unseat it, move quickly to its leftmost position, covering the end of the discharge duct 34. During this movement some of the lubricant to the left of the piston valve will be forced through the discharge duct 34 to the bearing. As the valve moves to the left it will first cover the discharge port 22 and then uncover the port 20. As soon as the piston valve 30 uncovers the port 20, lubricant will flow through said port into cylinder 18, forcing the plunger 36 upwardly.

The upper end of the plunger 36 is rounded and cammingly engages the surfaces 54 and 46 (Fig. 1) and when moved upwardly swings the semaphore arm clockwise about the stud 58 until upward swinging movement of the semaphore arm is limited by the engagement of the stop surface 50 at the end of the semaphore arm with the surface 62 at the lower end of the slot 38, as shown in dotted lines in Fig. 1.

When the signal is moved upwardly the operator will thereby be apprised of the fact that the system has received sufficient lubricant and will cease supplying lubricant to the system.

When the pressure on the system is relieved the piston valve 30 will move to the right, first covering the inlet port 20 and then uncovering the discharge port 22, and finally closing the port 26 by the seating of the projection 28. As soon as the port 22 is uncovered the weight of the semaphore arm 40 will cam the plunger 36 downwardly, forcing the lubricant from the cylinder 18.

The semaphore arm 40, being made of fairly heavy sheet metal, is sufficiently heavy and has sufficient leverage thereupon to force the plunger 36 downwardly and expel the lubricant from the cylinder 18 through the discharge port 20 and duct 34 to the bearing to be lubricated. This is true whether the semaphore arm is mounted as shown in Fig. 1 or is mounted as shown in Fig. 3.

The fact that the semaphore arm 40 has dropped to its lowermost position is a further indication to the operator that the device has operated satisfactorily and that the last bearing 10 of the series has been supplied with its measured quantity of lubricant.

The method of mounting the semaphore arm shown in Fig. 3 is frequently desirable when the bearing is located in certain positions where, due to the position of the bearing, the mounting shown in Fig. 1 would be inconvenient or impossible. The measuring and indicating device is thus capable of utilizing gravitational force to return the semaphore arm and piston to normal position irrespective of whether the device itself is inverted or not.

By utilizing gravitational force to return the semaphore arm and piston to normal position, the device is greatly simplified in construction and is more durable and efficient in operation. It will be noted that the semaphore arm depends at an angle of 45 degrees from the horizontal when it is in its normal or inoperative position and is horizontal in its actuated or operated position irrespective of whether or not the device is attached above or below the bearing.

The invention is capable of wide variation within equivalent limits and I contemplate such variation as may be desirable or useful in the particular adaptation of the invention shown, or in its adaptation to other devices. I do not restrict myself in any unessential particulars, but

What I claim and desire to secure by Letters Patent is:

1. A combination lubricant measuring and signal device comprising a pair of cylinders, an inlet and a discharge port connecting said cylinders, an automatically operable valve to control the admission and discharge of lubricant to and from one of said cylinders, a plunger in one of said cylinders, a semaphore arm pivoted adjacent the outer end of said plunger, and interengaging cam surfaces on said semaphore arm and plunger whereby reciprocation of the latter will swing said semaphore arm about its pivotal axis.

2. In combination, a measuring valve having a plunger adapted to protrude therefrom, a semaphore pivoted adjacent said plunger, and interengaging cam surfaces on said plunger and semaphore arm whereby reciprocation of the former will cause pivotal movement of the latter.

3. In combination, a measuring valve having a plunger adapted to protrude therefrom during the operation of said valve, a semaphore arm pivotally mounted on said valve adjacent said plunger, and cooperating cam surfaces on said semaphore arm and plunger whereby said plunger will be forced inwardly by the force of gravity exerted upon said semaphore arm.

4. As an article of manufacture, a semaphore arm having a pair of openings to receive a pivot pin, and having a pair of stop surfaces and a cam surface similarly located with respect to each of said openings.

5. A combined measuring valve and indicating device comprising a body having a storage cylinder, a valve cylinder extending transversely at the end of said storage cylinder, means for connecting a source of lubricant to said valve cylinder, said means including a valve seat, an inlet and an outlet port between said valve cylinder and said storage cylinder, means to connect said valve cylinder to a bearing to be lubricated, a spring pressed valve normally resting on said valve seat and cutting off communication between said valve cylinder and said source of supply, said valve being adapted upon a pressure impulse to close said outlet port and open said inlet port, thereby to permit the flow of lubricant from said source to said storage cylinder, and to return to the normal position upon cessation of said lubricant pressure impulse, a plunger reciprocable within said storage cylinder, a semaphore arm pivoted adjacent the outer end of said plunger and interengaging cam surfaces on said semaphore arm and said plunger whereby reciprocation of the plunger will swing said semaphore arm about its pivotal axis.

6. In combination, a measuring valve having a plunger adapted to protrude therefrom during the operation of said valve, a cam surface on the outer end of said plunger, a semaphore arm pivotally mounted on said valve adjacent the end of said plunger, a pair of cam surfaces on said semaphore arm, and complementary pivot apertures so arranged that the semaphore and arm may be rotated on a pivot in either of said pivot apertures by reciprocation of said plunger.

7. A combined lubricant measuring and signal device adapted to be mounted above or below a bearing to be lubricated, including a body, a storage cylinder and a valve cylinder in said body, a plunger in said storage cylinder, a cam surface on the end of said plunger, a semaphore arm pivoted adjacent said plunger, and a pair of cam surfaces on opposite sides of said semaphore arm, one for engagement with said plunger when the measuring and signal device is mounted above the bearing to be lubricated and the other for engagement with the plunger when the measuring and signal device is mounted below the bearing to be lubricated.

8. In a lubricating system, a combined measuring valve and indicating device comprising a body containing a storage cylinder, a plunger mounted therein having a cam surface on its upper end, a semaphore mounted on said body adjacent the upper end of said plunger, and an engaging cam surface on said semaphore for bearing on said plunger to force lubricant by gravity from said storage cylinder to a bearing to be lubricated.

9. A semaphore signaling device for use with lubricating systems comprising a member containing a measuring valve and a storage chamber, a plunger reciprocable in said chamber, upright standards on said member, a pivot pin carried by said standards, a semaphore arm mounted on said pivot pin, and a pair of mounting apertures in said semaphore arm, said semaphore arm being adapted to be operated by the action of the plunger when pivoted in either of said apertures.

In witness whereof, I hereunto subscribe my name this 21st day of February, 1929.

REUBEN WEDEBERG.